United States Patent [19]
Coates

[11] Patent Number: 5,770,066
[45] Date of Patent: Jun. 23, 1998

[54] CONVERTIBLE PRESSURE VESSEL HAVING A TIE ROD CONNECTING A SEPARATOR PLATE ASSEMBLY AND COMPRESSION SEAL ASSEMBLY

[75] Inventor: Daniel L. Coates, Fairfield, Ohio

[73] Assignee: Northeast Filter and Equipment Company, Chardon, Ohio

[21] Appl. No.: 740,880

[22] Filed: Nov. 4, 1996

[51] Int. Cl.$^6$ .................................................. B01D 29/17
[52] U.S. Cl. ...................... 210/232; 210/239; 210/323.2; 210/450; 210/454; 210/455; 210/470; 210/497.01
[58] Field of Search .................................. 210/232, 236, 210/237, 238, 239, 323.2, 339, 341, 450, 454, 455, 459, 470, 497.01; 29/896.6, 896.62

[56] References Cited

U.S. PATENT DOCUMENTS

| | | | |
|---|---|---|---|
| 2,028,061 | 1/1936 | Goldman | 210/454 |
| 4,022,693 | 5/1977 | Morgan, Jr. . | |
| 4,081,379 | 3/1978 | Smith . | |
| 4,105,562 | 8/1978 | Kaplan et al. . | |
| 4,133,769 | 1/1979 | Morgan, Jr. . | |
| 4,248,714 | 2/1981 | Acosta . | |
| 4,283,281 | 8/1981 | Cogan . | |
| 4,419,234 | 12/1983 | Miller et al. . | |
| 4,419,240 | 12/1983 | Rosaen . | |
| 4,610,787 | 9/1986 | Morgan et al. . | |
| 4,711,717 | 12/1987 | Wolf . | |
| 4,970,004 | 11/1990 | Rosaen | 210/454 |
| 5,028,323 | 7/1991 | Gould | 210/454 |
| 5,073,260 | 12/1991 | Wilkendorf | 210/341 |
| 5,149,431 | 9/1992 | Coen | 210/323.2 |
| 5,286,381 | 2/1994 | Buttery et al. | 210/341 |
| 5,296,134 | 3/1994 | Zaiter | 210/323.2 |

FOREIGN PATENT DOCUMENTS

| | | | |
|---|---|---|---|
| 596416 | 7/1959 | Italy | 210/454 |

OTHER PUBLICATIONS

Brunswick Technetics Technical Data Sheet–Filterite–Readi Clean Modular Filter (no date).
GAF Technical Data Sheet–Adaptors for Cartridges (no date).
American Felt & Filter Company–Technical Data Sheet–Filter Bag Pressure Filter System (no date).
AMF Technical Data Sheet–Type PC Cartride–Pak Filters (Mar., 1984).
Filtration Systems Technical Data Sheet–Cartridge Filter Housings (1992).

*Primary Examiner*—W. L. Walker
*Attorney, Agent, or Firm*—Frost & Jacobs LLP

[57] ABSTRACT

An improved filter assembly is provided using a bag-type vessel shell and a removable adapter assembly that contains multiple filter cartridges. The invention can be used with both double-open-end filter cartridges and single-open-end filter cartridges. In either case, both ends of the filter cartridges are held in place by individual positioning guides, so as to maintain a perpendicular orientation and seal integrity. In all cases, a knife-edge end seal is provided to be forced into the end surfaces of the filter cartridges. In one embodiment, a compression plate is provided with a single coil spring to force the multiple knife-edge end seals against their respective filter cartridges. In a second embodiment, individual floating end seals are provided at the compression plate to provide good seal integrity regardless of variations in length of the individual filter cartridges. In all embodiments, the separator seal and the ambient seal are one and the same assembly, thereby providing a visual indication of seal integrity between the contamination and purified fluids. In all embodiments, a quick-release tie-rod and handle configuration is used to easily assemble and disassemble the adapter assembly during filter cartridge replacement procedures.

20 Claims, 9 Drawing Sheets

CONVERTIBLE PRESSURE VESSEL HAVING A TIE ROD CONNECTING A SEPARATOR PLATE ASSEMBLY AND COMPRESSION SEAL ASSEMBLY

TECHNICAL FIELD

The present invention relates generally to filter assemblies and is particularly directed to fluid filters of the type which utilize cartridges that filter liquid media. The invention is specifically disclosed as a filter assembly in which a bag-type vessel shell is provided with a removable assembly containing multiple double-open-end filter cartridges. The seal integrity at both ends of the filter cartridges can be visually inspected before the removable adapter assembly is placed into the vessel. In addition, the separator seal and ambient seal are one and the same assembly, thereby providing a separator seal assembly that can be visually inspected, both before and during operation.

BACKGROUND OF THE INVENTION

Fluid filters are old in the art, and with respect to filtering liquids, there are two main types: (1) a "bag" filter and (2) a "cartridge" filter. Typical bag filters are comprised of a relatively open interior chamber surrounded by a shell, in which a rigid basket is placed and mounted at its top portions to the shell, and in which a flexible "bag" is placed inside the basket. The bag comprises the filter media, and the basket provides the necessary rigidity to support the bag as the liquid flows through the bag. In typical bag vessels, the liquid flow is from the inside of the bag, through the bag, and passing to its outside. Many bag vessels use a top inlet and a bottom outlet, and a typical top inlet approaches the bag vessel from its side, and the inlet piping is run through a goose-neck "over-the-top" piping structure.

A typical cartridge vessel comprises a relatively open interior chamber surrounded by a shell and a separation device (e.g., a separator plate) that is located between the inlet and the outlet of the vessel. One or more filter cartridges are mounted to the separator device such that contaminated liquid passes from the exterior of the cartridge, through the filter media, and into the interior spaces of the cartridge, then through the separator plate and on to the outlet. Typical cartridge vessels have side-entry inlets and outlets, although other orientations of inlets and outlets are known in the art, including bottom inlets or outlets.

There are certain advantages to modifying an existing bag vessel, by removing its filter media and basket, and installing a converter assembly comprising one or more filter cartridges that can be placed inside the shell of the bag vessel. With proper sealing construction, some of the advantages of this "hybrid" bag/cartridge vessel are: better efficiency with respect to the filtering surface area vs. void volume, and filter cartridges have a greater dirt holding capacity and can run at a higher pressure drop than can filter bags. For example, one conversion assembly available today is sold by GAF Filter Systems, manufactured in B-9100 Sint Niklaas, Belgium. The GAF conversion assembly uses a top-mounted separator plate, which interfaces to one or more single-open-end filter cartridges. The goose-neck "over-the-top" piping is retained, however, the direction of flow is reversed-i.e., the inlet becomes located at the bottom of the vessel, and the outlet is located at the top. In its present form, the GAF conversion assembly is limited to use with 226-style single-open-end cartridges.

Another conversion assembly is sold by Cuno Corporation, manufactured in Meriden, Conn. This is sold as a "PC Cartridge-Pak", and can be used with double-open-end filter cartridges. This design has certain disadvantages, such as numerous loose components, and the components themselves have numerous crevices which are difficult if not impossible to clean. Furthermore, its present design exclusively uses a side-entry configuration. Another disadvantage of this design is that the seal between the contaminated and purified chambers cannot be visually inspected, and once installed into the shell of the vessel, it is possible to have a catastrophic bypass between the purified and the contaminated chambers even though the ambient seals stay intact, thereby essentially masking the bypass problem from any visual indication. A visual indication of this contaminated/ purified sealing integrity is not possible once installed into the shell.

A conventional cartridge vessel is sold by Filterite division of Memtec, manufactured in Timonium, Md. Such a cartridge vessel is marketed under the trademark READI-CLEAN™, and is sold under the model number OMF. The filter cartridges can be removed as a single assembly, however, the mounting hardware for the filter cartridges comprises mostly a set of loose parts, which can be easily damaged or lost during filter cartridge replacements. In addition, the loose parts are not easily cleanable, and in fact have crevices that are virtually impossible to clean properly. Furthermore, the separator seal integrity cannot be visually inspected once the filter cartridge assembly is placed back into the shell of the vessel. Therefore, a catastrophic bypass could occur even though no visual indication at the ambient seals would be possible. Finally, the inlet of the READI-CLEAN™ vessel is at the top, and the outlet is at the bottom, leading to further problems where residual contaminated liquid will drip into the purified chamber of the vessel during cartridge replacement procedures.

SUMMARY OF THE INVENTION

Accordingly, It is a primary object of the present invention to provide a filter assembly useable with multiple filter cartridges in which a single integral compression seal sub-assembly is provided to which all the cartridges are mounted.

It is another object of the present invention to provide a filter assembly useable with multiple filter cartridges in which the separator seal and ambient seal are one and the same assembly.

It is a further object of the present invention to provide a filter assembly that uses multiple filter cartridges and contains an integral compression seal sub-assembly that has no inaccessible crevices, and is, therefore, easy to clean during maintenance procedures.

It is yet a further object of the present invention to provide a filter assembly in which a compression seal sub-assembly is provided in which knife-edge seals are forced against the ends of multiple double-open-end filter cartridges, and in which a separator plate sub-assembly is provided in which knife-edge seal are forced against the opposite ends of the cartridges.

It is yet another object of the present invention to provide a filter assembly which minimizes the number of parts that can come loose during a cartridge replacement procedure.

It is still another object of the present invention to provide a filter assembly using multiple filter cartridges where the fluid flow pathways include an inlet at the bottom and an outlet at the top of the vessel, and in which the outlet uses a gooseneck over-the-top piping arrangement.

It is still a further object of the present invention to provide a filter assembly which can be quickly disassembled by use of a lockable quick-release mechanism in order to change out the filter cartridges.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved filter assembly is provided in which a bag-type vessel shell is used in conjunction with a removable assembly containing multiple filter cartridges. The invention is specifically disclosed as using double-open-end filter cartridges, which are held in place by an individual positioning guide on each end of the filter cartridge. In one embodiment, a compression seal assembly is provided having a single coil spring to provide compression against the ends of all the filter cartridges, such that integral knife-edge end seals in both a compression plate and a separator plate provide seal integrity against both ends of each of the filter cartridges. The necessary compression of the coil spring is provided by a quick-disconnect and re-connect tie-rod that has a notch that is engaged by a handle having a locking pin. Once removed from the vessel, the removable assembly can be easily disassembled by use of the quick-release handle and tie-rod. Once the new filter cartridges are reinstalled, the sealing integrity can be visually inspected at both ends of the double-open-end cartridges. The separator seals are precisely the same structure as the ambient seals and, once the filter cartridge assembly is re-installed into the vessel's shell, the seal integrity for both the separator and ambient seals can be visually inspected. If a failure occurs that would produce a catastrophic bypass between the contaminated and purified fluids, then there would also be an ambient seal failure, which means that fluid would leak to the outside of the vessel shell, thereby providing a visual indication of such failure.

The positioning guides used at both ends of the filter cartridges can be constructed in various ways. In one embodiment, the positioning guides are fluted. In another instance, the positioning guides on one end are perforated, and on the other end have a solid surface. Furthermore, the above-described embodiment can be used with single-open-end filter cartridges, in which the closed end of the cartridge has its bayonet fitting mated to a positioning guide in the compression plate sub-assembly. Moreover, in the above-described embodiment, the fluid flow preferably runs from the bottom inlet through the top outlet, and the top outlet is illustrated as being a goose-neck over-the-top piping configuration.

In a second embodiment of the invention, a bag vessel shell is provided with an assembly that contains multiple filter cartridges. The major components of the second embodiment are identical in some places as compared to the above-described first embodiment. One major difference is that the compression seal sub-assembly, which, instead of providing a single coil spring for a compression plate that mounts against all of the filter cartridges, individual coil springs and floating end seals, one per filter cartridge, are provided. In the second embodiment, the floating end seals can individually move perpendicular to the compression plate, thereby allowing for relatively large variations in length between individual filter cartridges while providing good seal integrity. Some of the other aspects of the first embodiment are included in the second embodiment, including: (1) a positioning guide at both ends of a double-open-end filter cartridge, (2) a one-piece removable assembly that can be taken out of the vessel's shell to replace the filter cartridges, (3) after the cartridges have been replaced, a visual test of seal integrity at both ends of the cartridges by use of a common separator and ambient seal configuration, (4) a quick-release tie-rod and handle configuration, and (5) the separator seal and ambient seal are one and the same structure.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
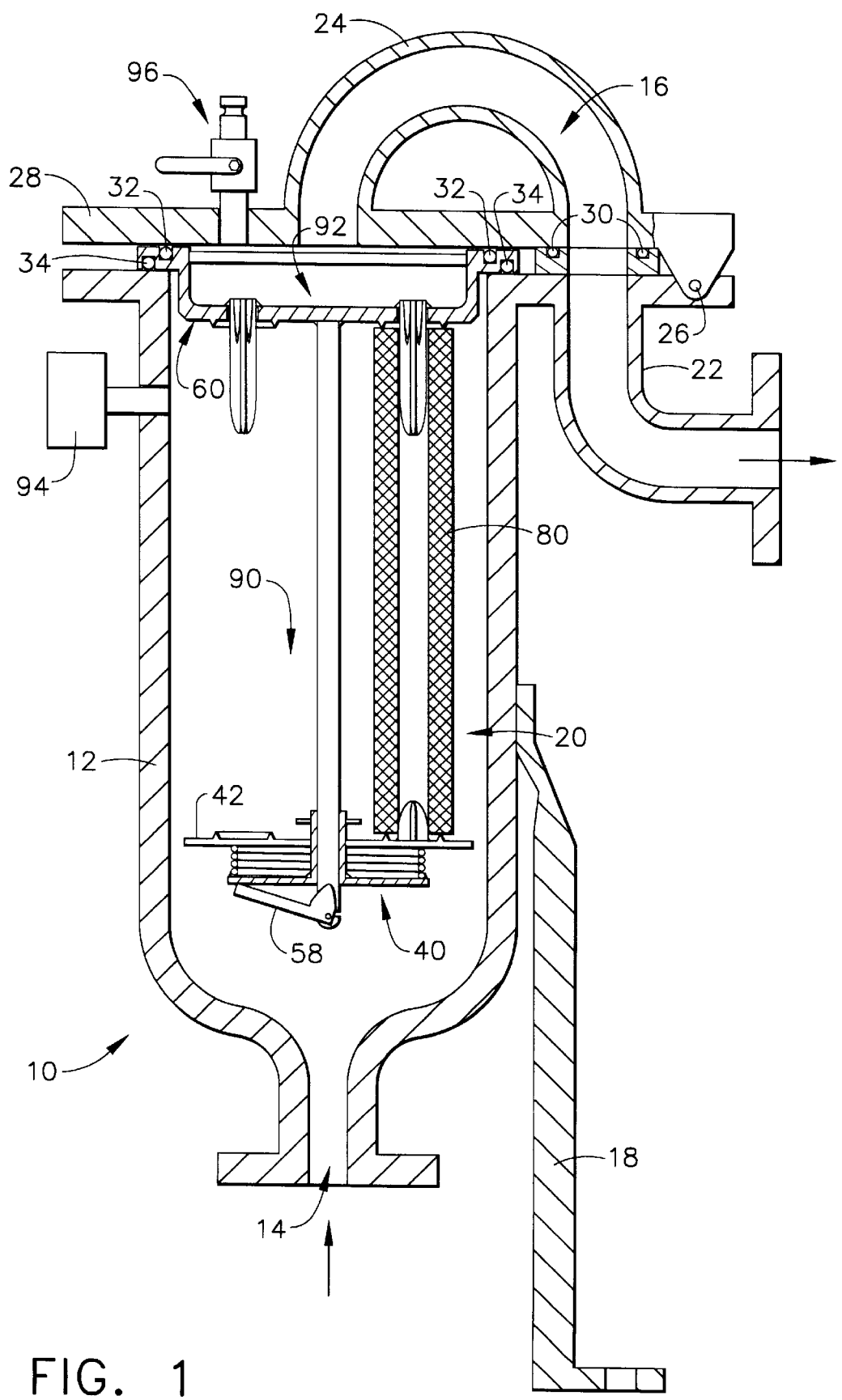
FIG. 1 is an elevational view, in partial cross-section, of an improved cartridge filter assembly that mounts double-open-end filter cartridges, as constructed according to the principles of the present invention.

Referring now to the drawings, in FIG. 1 an improved cartridge vessel assembly is generally designated by the index numeral 10. The major components of cartridge vessel assembly 10 include a bag vessel shell 12, an inlet 14, an outlet 16, and a removable filtering sub-assembly, generally designated by the index numeral 20. The vessel assembly 10 would typically be mounted in the vertical direction, as shown in FIG. 1, using one or more mounting legs 18.

As will be understood by those of ordinary skill in the art, conventional cartridge vessels have been available in which the inlet and outlet openings are located along the sides of the vessel. Alternatively, some conventional cartridge vessels also have both their inlet and outlet located at the bottom of the vessel, used for "in-line" installations, and other conventional cartridge vessels have a side inlet and a bottom outlet. On the other hand, conventional bag vessels are typically available with two different piping schemes: in one instance the inlet and outlet passages are located along the sides of the vessel, and in other instances the outlet passage is located at the bottom of the bag vessel and the inlet is at the top. In many instances, the inlet piping is directed toward the side of the bag vessel, but then goes through a "gooseneck over-the-top" inlet scheme. Generally speaking, the goose-neck over-the-top type of inlet is used for single-pocket bag vessels, and it will be understood that there are also multi-type bag vessels available in the conventional art.

In the design of the first embodiment improved cartridge vessel 10, it is preferred to use a bag vessel shell (i.e., shell 12) and the goose-neck over-the-top piping scheme, in which this over-the-top piping represents the outlet 16. One main advantage of this configuration is that, when it is time to change the cartridges within the housing of the vessel, the operator will be able to access the "clean" side of the vessel at the vessel's top. As will be described in more detail hereinbelow, the entire adapter assembly 20 is removable as a single unit, once the top portion of the vessel 10 has been removed. As can be best seen in FIG. 1, the outlet piping 16 is comprised of two separate portions, a stationary portion at index numeral 22 which connects to the field piping, and a pivotable portion 24 (that forms the goose-neck shape of this portion of the outlet piping) which can be removed from the remaining portions of vessel 10 by loosening fasteners (e.g., swing bolts), and then lifting the top portion of vessel 10 so that it pivots about a pivot point 26 so that the entire top cover 28 and goose-neck pipe 24 can be moved out of the way for the adapter assembly 20 to be removed in the vertical direction. As can be seen in FIG. 1, the outlet piping preferably has an O-ring seal at index numeral 30. A double set of O-ring seals is preferably installed between the top mounting plate 28 and the top portions of the vessel shell 12 on either side of the flange portion of the top of the adapter assembly 20, and these O-rings are designated by the index numerals 32 and 34.

Adapter assembly 20 comprises three main components, a compression seal sub-assembly, generally designated by the index numeral 40, a tie-down handle 58, and a separator plate sub-assembly, generally designated by the index numeral 60. In addition, one or more filter cartridges 80 would be used, and their mounting technique will be described in more detail below.

Figure 2:
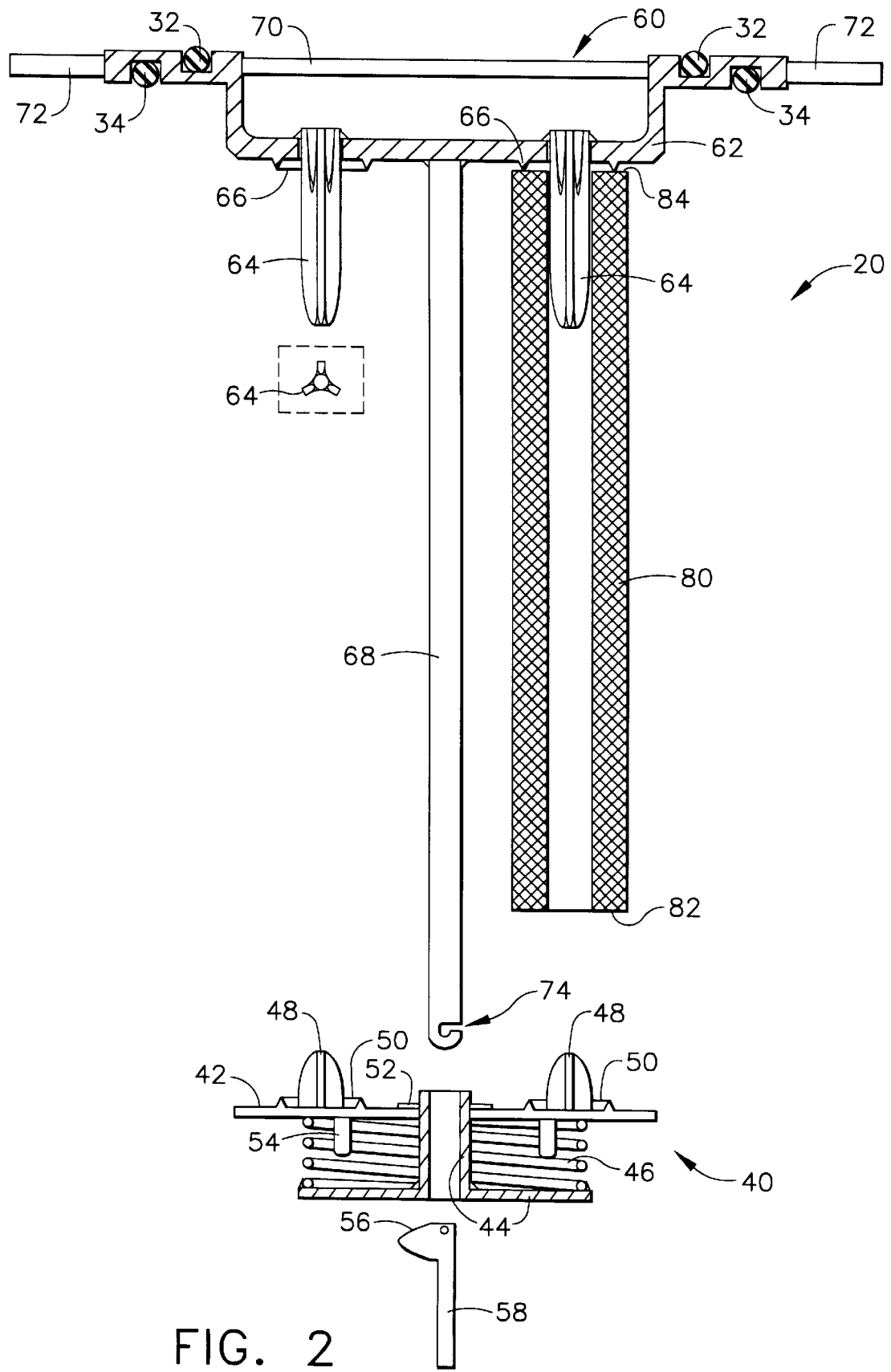
FIG. 2 is an elevational exploded view, in partial cross-section, of a one-piece removable adapter assembly used in the filter assembly of FIG. 1.

As best viewed in FIG. 2, compression seal sub-assembly 40 includes a compression plate 42 and a slidable spring retainer 44, which can move relative to compression plate 42. A coil spring 46 is mounted between compression plate 42 and spring retainer 44. The maximum travel of spring retainer 44 with respect to compression plate 42 is controller by a retainer clip 52, which preferably is a snap ring, and fits into a notch (not shown) in the surface of the cylindrical portion of spring retainer 44. One or more spring positioning guides 54 are preferably positioned within the inner portions of coil spring 46.

One or more positioning guides 48 (which in FIG. 2 are fluted) are located on the opposite surface of compression plate 42, and these guides 48 are designed to receive one of the open ends of the filter cartridge 80. Also on this surface of compression plate 42 is a circular end seal 50 around each of the positioning guides 48, and these end seals 50 preferably create a "knife-edge" seal. Each positioning guide 48 and end seal 50 are designed to receive one of the open ends of a double-open-end filter cartridge 80, in which the positioning guide 48 receives the inner diameter of the filter cartridge and is preferably designed to maintain seal integrity, both by eliminating cartridge movement (i.e., so that the cartridge cannot rotate), and to keep the cartridge perpendicular with respect to the orientation of compression plate 42 by preventing pivoting. End seal 50 is designed to be forced into the end surface 82 of the filter cartridge 80, thereby maintaining seal integrity and eliminating any rotation or pivoting of the filter cartridge with respect to compression plate 42.

Also as best viewed in FIG. 2, the separator plate sub-assembly 60 comprises a separator plate 62, which contains one or more positioning guides 64 to hold filter cartridges 80 in place. There are two sets of O-ring seals, 32 and 34, which maintain seal integrity against some of the inner surfaces of filter assembly 10, specifically at the inner surface of the shell 12, and the inner surface of the cover plate 28. Seals 32 and 34 act as the ambient seals used in maintaining the overall seal integrity between the shell 12 and the pivotable portions that make up the goose-neck outlet. These seals 32 and 34 also act as separation seals between the contaminated fluid that resides within a chamber at index numeral 90, and the purified fluid that resides within the chamber designated by the index numeral 92. One advantage of this design over conventional side-entrance cartridge filters is that any failure of seal integrity at O-rings 32 and 34 will be visible to the operator, because fluid would appear on the outside surfaces of either the shell 12 or cover plate 28. Not only would this type of failure cause an ambient leak, but also would represent a leakage failure between the contaminated fluid and purified fluid, that typically are retained exclusively within their chambers 90 and 92, respectively. Such unwanted mixing, of course, is undesirable. In other adaptable side-entrance cartridge filters, interior seals are used to separate the contaminated and purified fluids, and a seal failure at this interior seal would not be directly noticeable by the operator.

On the inner surface of separator plate 62, one or more positioning guides 64 are located, which are designed to match up in physical location with corresponding positioning guides 48 that are located on compression plate 42. In FIG. 2, positioning guide 64 preferably are fluted in shape, and are designed to retain the filter cartridges 80 in a perpendicular manner with respect to the inner surface of separator plate 62. Also on this inner surface of separator plate 52 are circular end seals 66, which preferably are constructed in a knife-edge shape, much like the end seals 50 on compression plate 42. As related above, these knife-edge end seals are designed to prevent rotation of the filter cartridges 80 by pushing into the end surface 84 of the filter cartridge 80.

It is preferable that each of the positioning guides 48 are permanently attached (e.g., by welding) to the compression plate 42. Similarly, it preferred that each of the positioning guides 64 be permanently attached to the separator plate 62. This is a distinct advantage over conventional cartridge filter assemblies which typically use spring-loaded top seals, and a press-fit bottom seal. The press-fit bottom seal is typically mated to a separator plate, and a V-post tube guide is typically press-fit into the press-fit bottom seal. These press-fit components typically come loose after one or more cartridge filter replacement procedures, and seal integrity is easily lost in such situations for various reasons. In one situation, the press-fit bottom seal becomes broken or chipped, and either must be replaced or re-oriented, often leading to a lack of seal integrity. In another situation the V-post tube guides become non-perpendicular with respect to the separator plate, and the cartridge filters will wobble, or at least not remain in the correct perpendicular orientation. At the opposite end of the filter cartridge in conventional constructions, the spring-loaded top seals can come loose, or they can become dropped and nicked, or they can become lost. In all of those situations, seal integrity easily can be compromised.

Also mounted on the interior surface of separator plate 62 is a longitudinal shaft which acts as a tie-down rod, designated by the index numeral 68. Tie-down rod 68 extends the entire length of the filter cartridges, and also through the open inner diameter of spring retainer 44, so that its distal end is accessible to be mated to a locking pin 57 of the tie-down handle 58 (see FIG. 10). Once the locking pin 57 is inserted into the notch 74, the tie-down handle 58 can be pivoted, and its cam surface 56 will engage the outer surface of spring retainer 44, thereby forcing spring retainer 44 to compress the spring 46 against the compression plate 42. This action will force the knife-edge end seal 50 against the end surface 82 of filter cartridge 80, and this compression force will also translate to the other end of the cartridge in which the end 84 is forced against the knife-edge end seal 66 of the separator plate 62. Once the tie-handle 58 is completely rotated about locking pin 57, the handle 58 becomes locked in place while retaining spring tension against compression plate 42.

As seen on FIG. 1, a pressure gauge 94 is preferably installed to monitor the pressure drop across the filter media of the filter cartridges 80. In addition, it is preferable to mount a blow-down valve 96 in the cover plate 28. This preferably can be used to (1) back-blow the filter cartridge thereby extending their life by performing a cleaning process, although it would probably be better to introduce compressed air at a point further downstream of filter assembly 10, so that a greater volume of liquid could be used to back-flush these filter cartridges; and (2) by use of compressed air, blow-down the liquid level of the entire filter assembly 10, which would be a normal procedure when performing any cartridge replacements or other maintenance on the filter assembly.

Another primary advantage of the construction of the present invention is the fact that the entire adapter assembly 20 is removable as a single unit from the interior spaces of the shell 12. After opening cover plate 28 and pivoting it and the goose-neck portion of outlet 16 out of the way, the entire adapter assembly 20 can be vertically removed for filter cartridge replacement. A lift handle 70, or lifting tabs 72 could be provided to enable the operator to remove adapter assembly 20.

To perform a filter cartridge replacement procedure, once adapter assembly 20 has been removed from shell 12, the tie-down handle 58 would be reversed-pivoted to unlock the locking pin 57 from the notch 74. This releases the compression between spring retainer 44 and compression plate 42. The filter cartridges 80 can now easily be removed from their respective positioning guides 48 and 64, and new filter cartridges inserted into those same guides. One primary advantage of this construction is that the seal integrity of the ends of filter cartridges 80 can be inspected and tested. The seal integrity between end 82 and end seal 50, and the integrity between end 84 and end seal 66, can be visibly inspected. This offers seal integrity confidence between the contaminated and purified spaces of the vessel, and this confidence is not available in conventional cartridge filter designs. Once the adapter assembly 20 is re-installed inside shell 12, the only possible source of leakage now becomes the interface between the end of shell 12 and the bottom surface of cover plate 28, which will be protected by the O-rings 32 and 34. As described hereinabove, even if this seal integrity would fail, such failure would immediately become visibly noticeable to the operator.

Another advantage of the present construction is that, upon breaking ambient seal and removing the adapter assembly 20, there is no danger of residual contaminated fluid dripping down and contaminating the remaining purified fluid that is remaining in the system or any other portion of the purified chamber. In the preferred embodiment all wetted surfaces are accessible for cleaning and later inspection to increase confidence of having no contamination remaining in the purified chamber. This purified chamber includes the interior volume of each of the filter cartridges 80 as well as their respective positioning guides 48 and 64, and further the chamber 92.

Figure 3:
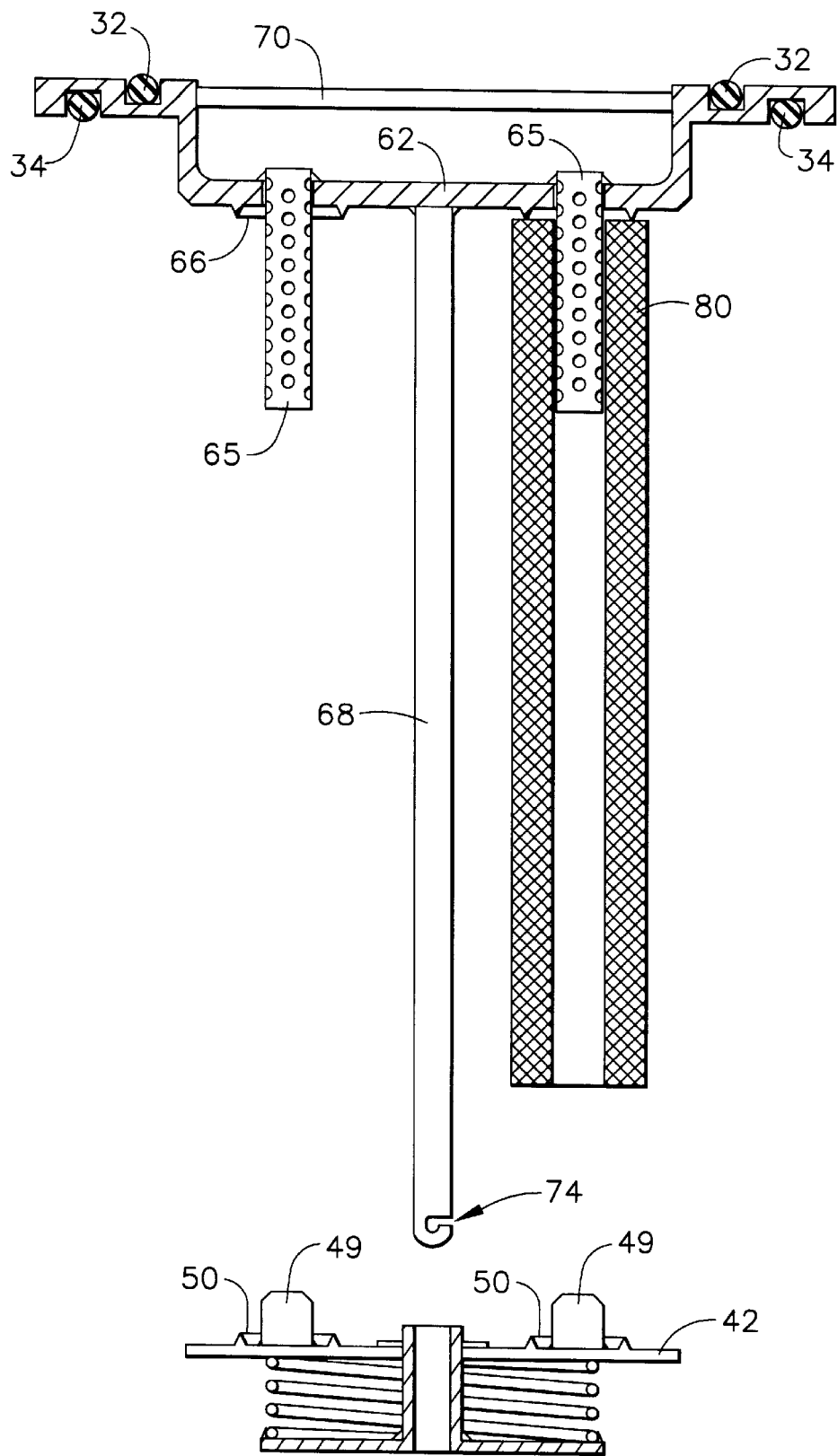
FIG. 3 is an elevational exploded view, in partial cross-section, of a one-piece removable adapter assembly using alternate construction positioning guides, as used in the filter assembly of FIG. 1.

A further refinement of adapter assembly 20 would be to provide perforated positioning guides 65 at separator plate 62, and a solid cylindrical positioning guide 49 at the compression plate 42 (see FIG. 3). The perforated positioning guides 65 would be somewhat easier and cheaper to construct, although they may be more difficult to clean during a filter cartridge replacement procedure then the fluted similar guides 64. The solid cylindrical positioning guide 49 also would likely be less costly to construct than the fluted equivalent positioning guide 48.

Figure 4:
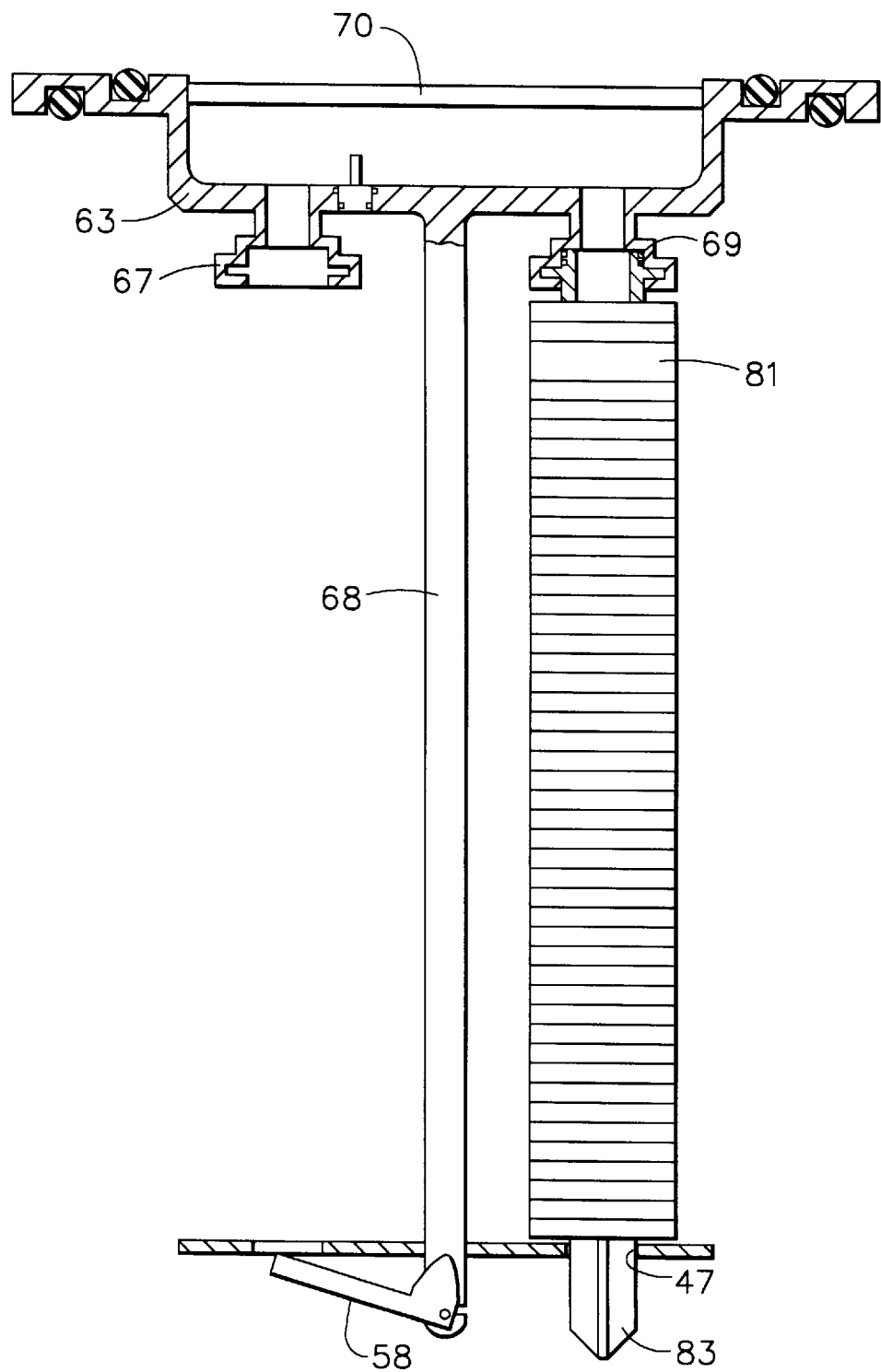
FIG. 4 is an elevational view, in cross-section, of a removable adapter assembly that mounts single-open-end filter cartridges, as used with the filter assembly of FIG. 1.

It will be understood that filter assembly 10 could easily be adapted for use with single-open end filter cartridges without departing with the principles of the present invention (see FIG. 4). It is also within the scope of the present invention to configure the filter assembly 10 with a side-entry inlet and outlet, although this is not the preferred mode.

In FIG. 4, the invention has been adapted for use with single-open-end filter cartridges 81. The separator plate, designated by index numeral 63 in FIG. 4, now has one or more receptacles 67 that are designed to mate with the open end of the filter cartridge 81. This would typically be a sealed fitting, and the open end of the filter cartridge would typically be provided with one or more O-rings at 69, as are used in industry standard 226-style fittings. Although the illustrated embodiment of FIG. 4 depicts the use of a 226-style fitting, it will be understood that other industry standard fittings could be used without departing from the principles of the present invention, including use of a 222-style fitting in which locking tabs are eliminated.

On the opposite end of the filter cartridge 81 is a bayonet fitting 83 which mates to a positioning guide, designated by the index numeral 47. In the illustrated embodiment of FIG. 4, positioning guide 47 comprises merely a circular opening for adaptation to receive the bayonet fitting 83. There is no need to provide any type of seal at this end of the filter cartridge 81, because this is the closed end. The positioning guide 47 and bayonet fitting 83 are provided at the closed end of filter cartridge 81 so as to assist to in providing seal integrity at its open end at separator plate 63 (i.e., by keeping filter cartridge 81 perpendicular to the separator plate 63).

As in the above-described embodiment using double-open-end cartridges, the illustrated embodiment of FIG. 4 has similar advantages in that the filter cartridges can be cleaned by a blow-down procedure, and the filter cartridges can be replaced by removing the entire adapter assembly 20 as a single unit while not introducing contaminated residual fluid into any purified areas. During such a replacement procedure all wetted surfaces can be cleaned and inspected and seal integrity can be visually confirmed before re-installation of the adapter assembly 20.

Figure 5:
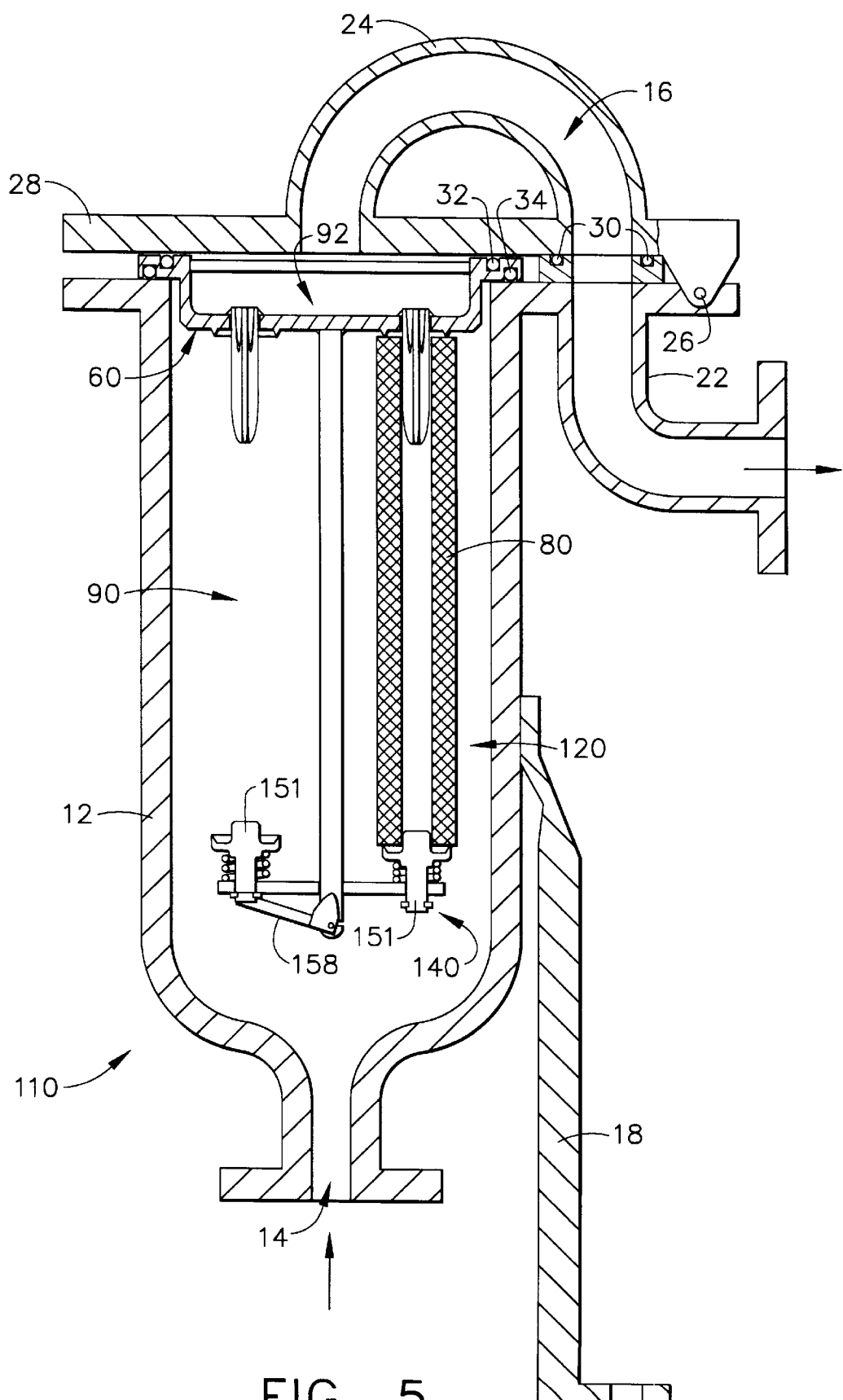
FIG. 5 is an elevational view, in partial cross-section, of a second embodiment improved filter assembly as constructed according to the principles of the present invention, in which individual floating end seals are provided at the lower end of the double-open-end filter cartridges.

A second major embodiment filter assembly, generally designated by the index numeral 110, is depicted on FIG. 5. Many of the components of filter assembly 110 are identical to the earlier-described filter assembly 10, described in FIGS. 1–4. The major difference is the compression seal sub-assembly 140 of a removable adapter assembly 120, which now uses individually spring-loaded positioning guides 148 (see FIG. 6) to retain the bottom open end of the filter cartridge 80. These individually spring-loaded positioning guides 148 can operate quite successfully in situations where there is a relatively large variance in the length of each of the individual filter cartridges 80, while providing a secure seal against the bottom surface 82 of the filter cartridge 80.

Figure 6:
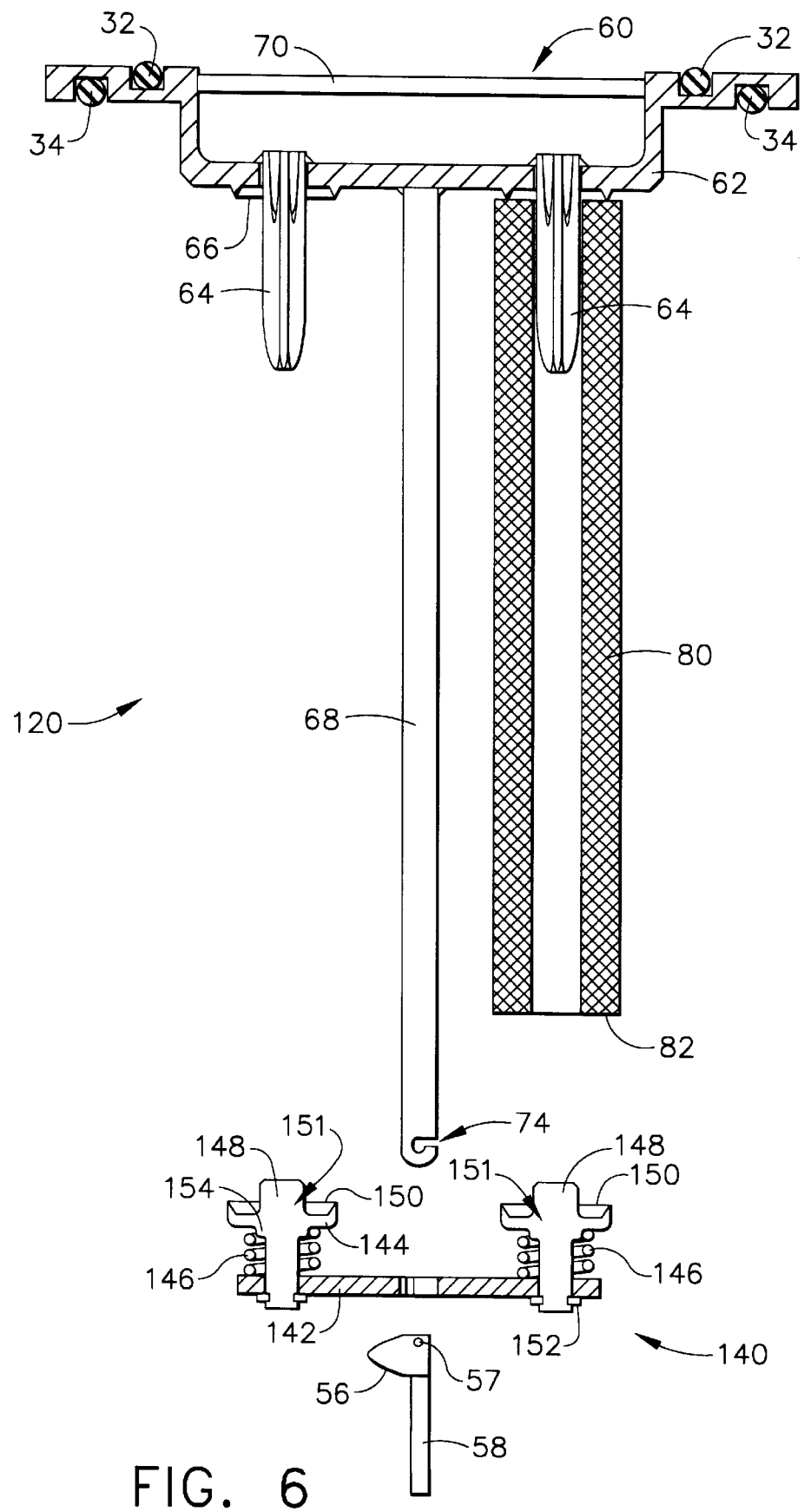
FIG. 6 is an elevational exploded view, in partial cross-section, of the removable adapter assembly that is provided in the filter assembly of FIG. 5.

As can be seen on FIGS. 5 and 6, a portion of the positioning guide 148 is constructed to fit within the inner diameter of the filter cartridge 80 at its lower end. Positioning guide 148 preferably is constructed as an integral one-piece unit, so that its surfaces exhibit no crevices and are, therefore, easy to clean. This includes curved surfaces such as those that form the end seals, including the surfaces that form the knife-edge circular surface 150 that seals against the bottom surface 82 of the filter cartridge 80. Another diametral land, at index numeral 154, acts as a spring positioning guide for the individual coil springs 146, and which presses against a spring retainer portion 144 and a compression plate 142. Positioning guide 148, knife-edge seal 150, spring positioning guide 154, and the cylindrical body that leads back to a retainer clip 152 all comprise an integral unit, designated by the index numeral 151, that acts as a floating end seal.

As can best be seen in FIG. 6, floating end seals 151 are moveable with respect to the compression plate 142. Also as shown in FIG. 6, the springs 146 are in their most de-compressed state, and the retainer clips 152 prevent the floating end seals 151 from falling away from their mating holes in compression plate 142. When handle 58 is assembled to the tie-down rod 68, springs 146 become compressed by virtue of the contact between the knife-edge end seals 150 against the end surfaces 82 of the filter cartridges 80. As related above, there can be a rather large variance between the lengths of the individual filter cartridges 80 using the sealing system shown in FIG. 6 without danger of losing seal integrity.

Similar to the first embodiment shown in FIGS. 1 and 2, adapter assembly 120 also is an integrally assembled and disassembled unit within the shell 12 of filter assembly 110. Once the cover plate 28 has been removed, the entire adapter assembly 120 can be lifted vertically and moved to a location where the filter cartridges 80 can be replaced. The entire adapter assembly 120 can be easily disassembled and cleaned, and then, upon re-assembly using replacement filter cartridges, the entire adapter assembly 120 can be visually inspected for proper seal integrity. The entire unit can then be re-installed into the shell 12 of filter assembly 110. At that point, the only remaining sealing integrity issue is the ambient seal, provided by O-rings 32 and 34. If this ambient seal is not properly made, a leakage problem will become immediately visible to the operator. These same O-rings 32 and 34 are also used, as in the previously-described embodiment, to provide the necessary isolation between the contaminated and purified fluids.

Figure 7:
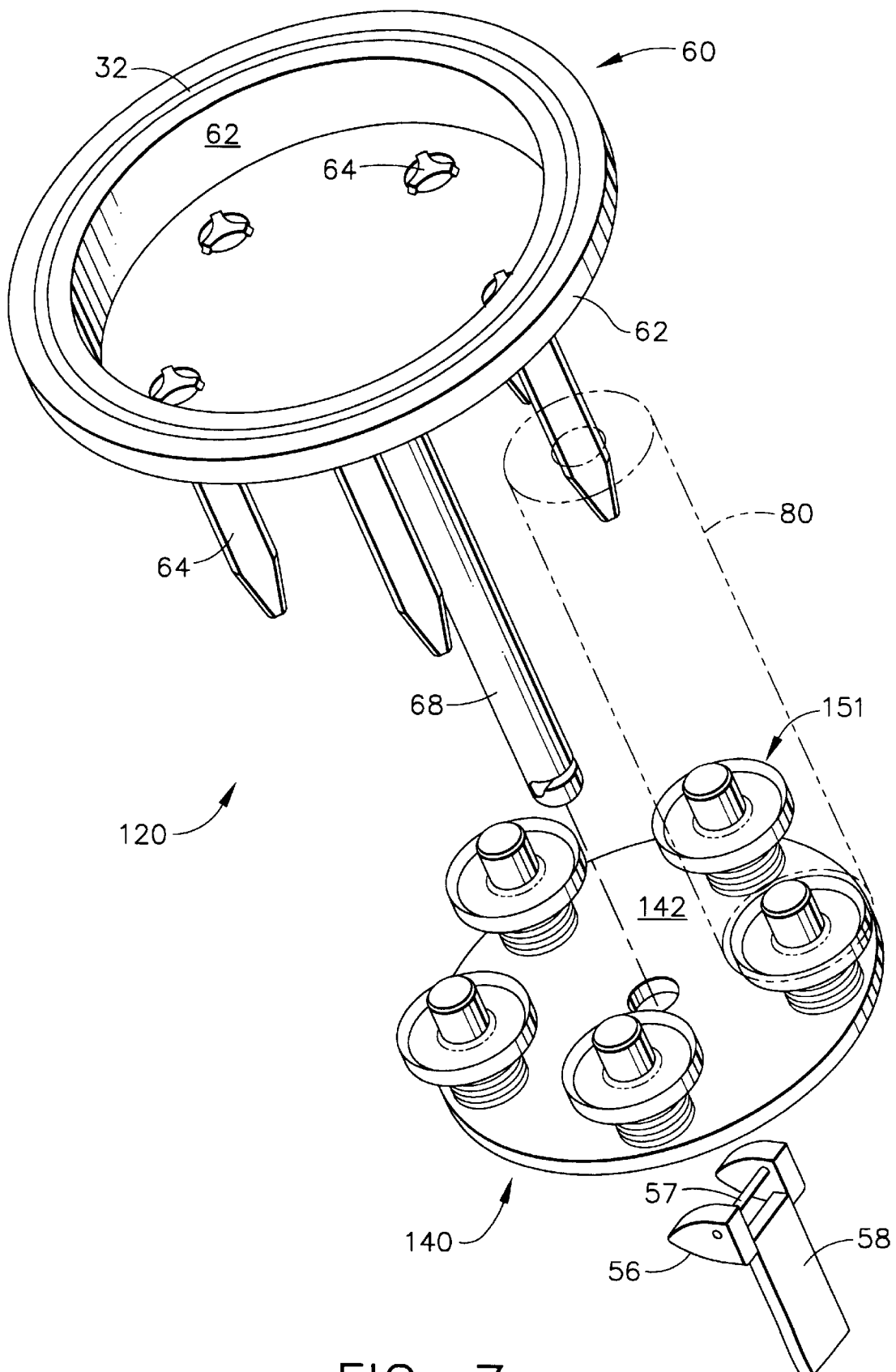
FIG. 7 is a perspective exploded view of the removable adapter assembly of FIG. 6.

In FIG. 7, a perspective view of the adapter assembly 120 is provided to more clearly illustrate the structure of the individual floating end seals 151 in relation to the compression plate 142, and the overall orientation between the separator plate sub-assembly 60 and the compression seal sub-assembly 140. The sealing structure of the upper O-ring 32 is also depicted in FIG. 7. Furthermore, the construction of the fluted positioning guides 64, as seen from above separator plate 62, is easily viewed, showing the openings between the fluted structures that allow the purified fluid to pass from the inner diameter of the filter cartridges 80 to the purified chamber 92.

Figure 8:
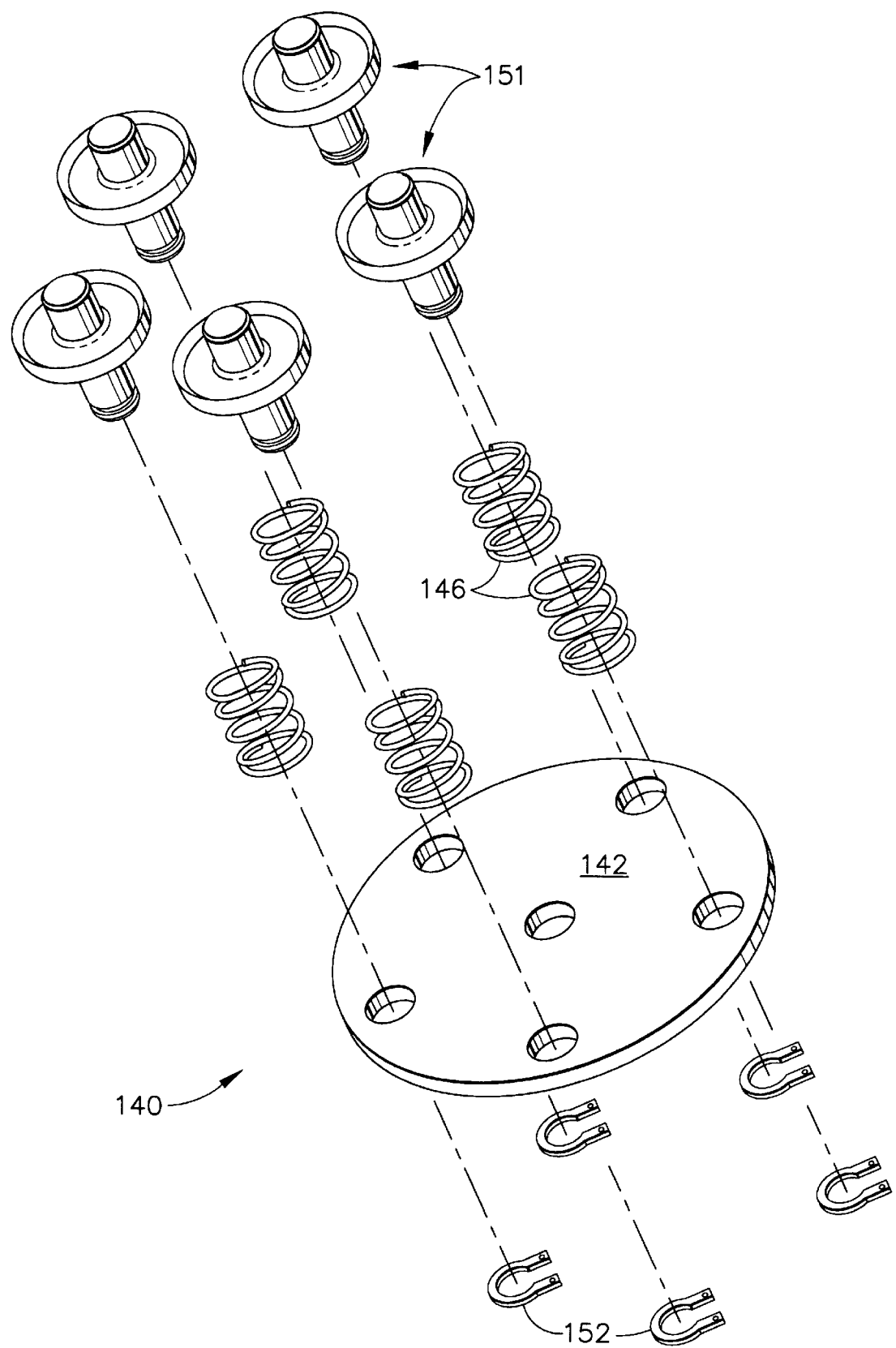
FIG. 8 is a perspective exploded view of the compression seal sub-assembly used in the adapter assembly of FIG. 7.

FIG. 8 shows the details in an exploded view of the floating end seals 151 and their associated hardware for mounting to the compression plate 142, thereby making up the entire compression seal sub-assembly 140.

Figure 9A:
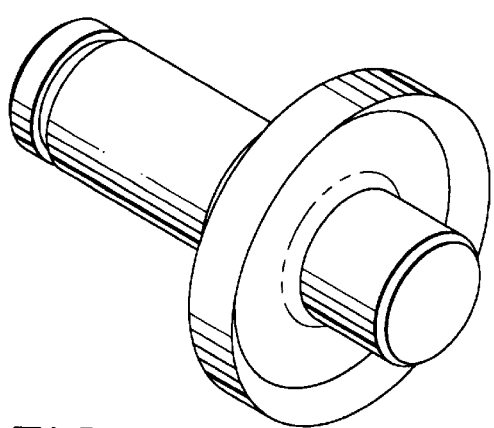
FIG. 9 (including FIGS. 9A and 9B) is a perspective view and a cross-sectional view of one of the floating end seals used in the compression seal sub-assembly of FIG. 8.
Figure 9B:
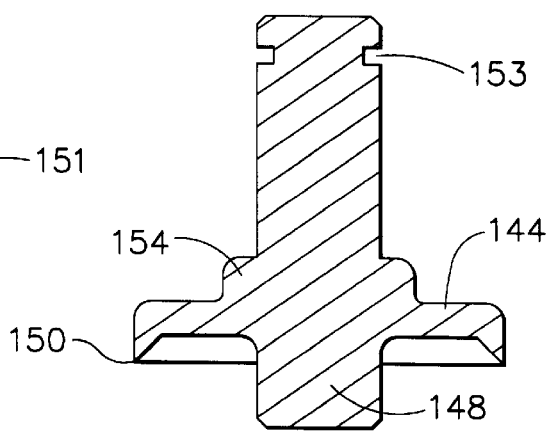
Figure 10A:
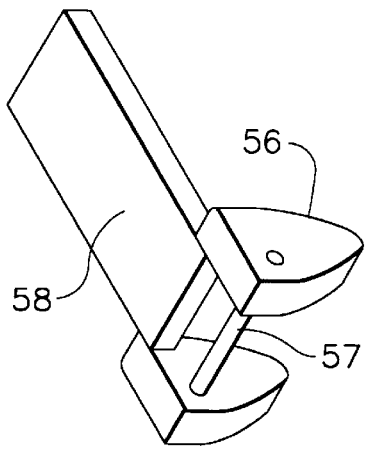
FIG. 10 (including FIGS. 10A, 10B, 10C, and 10D) shows several views of the locking tie-down handle that engages the tie-rod of both embodiments of the present invention shown in FIGS. 1 and 6.
Figure 10B:
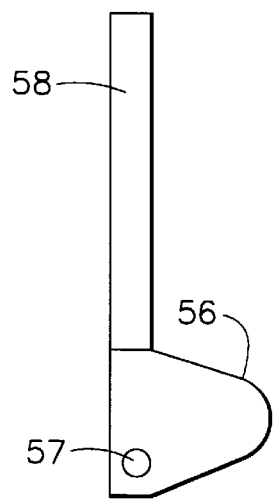
Figure 10C:
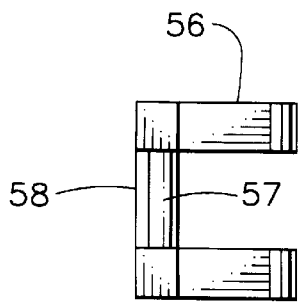
Figure 10D:
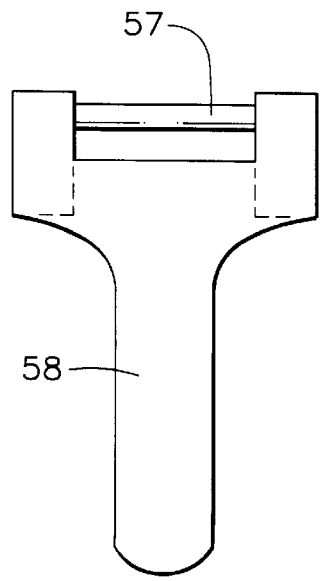

FIG. 9 shows the construction details of one of the floating end seals 151, and in particular, shows the cross sectional view showing the details of the shape of the knife-edge seal 150, and the spring positioning guide 154. The notch for the retainer clip is indicated at index numeral 153. As can be easily seen, all wetted surfaces exhibit no crevices that would be difficult to clean.

In FIG. 10, the construction details of the tie-rod handle 58 are depicted, showing the locking pin 57 and the cam surface 56.

It will be understood that the embodiments related hereinabove can also be used in horizontal vessel mountings.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A filter assembly, comprising:
    a pressure vessel having an inlet at a first end of said vessel and an outlet at a second end of said vessel and means for permanently connecting processing piping to said inlet and said outlet;
    a separator plate assembly having at least one first positioning guide and a sealing surface per first positioning guide;
    a compression seal assembly having at least one second positioning guide and a sealing surface per second positioning guide;
    a tie rod that connects the separator plate assembly to the compression seal assembly;
    a filter cartridge located between each of said at least one first and second positioning guides;

said separator plate assembly and said compression seal assembly being placed under compression with respect to one another via said tie rod; and an ambient seal, which also acts as a separator seal between a contaminated chamber and a purified chamber of said filter assembly, said ambient seal being placed along the edges of the separator assembly, a pivotable or removable cover which, when opened, does not interrupt the process piping, mounted on said vessel in contact with said ambient seal, and said cover and separator assembly creating a purified chamber along the inside of the vessel therebetween.

2. The filter assembly as recited in claim 1, further comprising a quick release tie-down handle having a cam surface that locks said tie-rod into the correct position, while maintaining compression between said separator plate assembly and said compression seal assembly.

3. The filter assembly as recited in claim 1, wherein said compression seal assembly further comprises a flexible compression element and a compression plate.

4. The filter assembly as recited in claim 1, wherein said compression seal assembly further comprises a mounting plate having a flexible compression element per each said second positioning guide.

5. The filter assembly as recited in claim 1, wherein said compression seal assembly is constructed as an integral construction, including all second positioning guides and all sealing surfaces that contact an end of one of said filter cartridges.

6. The filter assembly as recited in claim 1, wherein said compression seal assembly lacks any crevices which would otherwise be difficult or impossible to clean.

7. The filter assembly as recited in claim 1, wherein all sealing surfaces on said separator plate assembly and said compression seal assembly which contact one of the filter cartridges comprise a knife-edge construction.

8. The filter assembly as recited in claim 7, wherein all sealing surfaces on said separator plate assembly and said compression seal assembly that contact the end of one of the filter cartridges can be visually inspected for sealing integrity.

9. The filter assembly as recited in claim 1, wherein said inlet is located at the bottom portion of said filter assembly, and the outlet is located at the top portion of said filter assembly.

10. The filter assembly as recited in claim 9, wherein said outlet is constructed of a goose-neck over-the-top construction.

11. The filter assembly as recited in claim 1, wherein each of said filter cartridges comprises a double-open-end cartridge filter.

12. The filter assembly as recited in claim 1, wherein each of said filter cartridges comprises a single-open-end cartridge filter.

13. A method for converting a bag-type filter assembly into a cartridge-type filter assembly, comprising the steps of:

(a) removing the retainer basket from the interior of a vessel of said filter assembly;

(b) installing into the interior of said vessel a filter cartridge assembly that includes: a separator plate assembly having at least one first positioning guide and corresponding sealing surface, the compression seal assembly having at least one second positioning guide and corresponding sealing surface, a tie-rod that connects the separator plate assembly to the compression seal assembly, a filter cartridge located between each of said at least one first and second positioning guides, wherein said separator plate assembly and said compression seal assembly are placed under compression with respect to one another via said tie-rod and a flexible compression element, an ambient seal that also acts as a separator seal between a contaminated chamber and a purified chamber of said filter assembly; and (c) reversing the inlets and outlets such that the inlet is at the bottom of said filter assembly and the outlet is at the top of said filter assembly.

14. The method as recited in claim 13, further comprising the step of visually inspecting the sealing integrity between each said sealing surface and adjacent filter cartridge before the step of installing said filter cartridge assembly into the interior of said vessel.

15. The method as recited in claim 13, further comprising the steps of removing said filter cartridge assembly from the interior of said vessel, and actuating a quick release tie-down handle to release compression between said separator plate assembly and said compression seal assembly.

16. The method as recited in claim 15, further comprising the steps of replacing said at least one filter cartridges adjacent to said at least one first and second positioning guides, actuating said quick release tie-down handle to provide compression between said separator plate assembly and said compression seal assembly, and re-installing said filter cartridge assembly into the interior of said vessel.

17. The method as recited in claim 13, wherein said inlet is located at the bottom portion of said filter assembly, and the outlet is located at the top portion of said filter assembly.

18. The method as recited in claim 17, wherein said outlet is constructed of a goose-neck over-the-top construction.

19. The method as recited in claim 13, wherein each of said filter cartridges comprises a double-open-end cartridge filter.

20. The method as recited in claim 13, wherein each of said filter cartridges comprises a single-open-end cartridge filter.

* * * * *